(12) United States Patent
Beckett

(10) Patent No.: US 6,227,134 B1
(45) Date of Patent: May 8, 2001

(54) ELASTOMERIC FENDER

(75) Inventor: Robert P Beckett, Bangor (GB)

(73) Assignee: Valpar Industrial Limited (GB)

( * ) Notice: Subject to any disclaimer, the term of this patent is extended or adjusted under 35 U.S.C. 154(b) by 0 days.

(21) Appl. No.: 09/194,119

(22) PCT Filed: May 15, 1997

(86) PCT No.: PCT/GB97/01328

§ 371 Date: Nov. 23, 1998

§ 102(e) Date: Nov. 23, 1998

(87) PCT Pub. No.: WO97/44236

PCT Pub. Date: Nov. 27, 1997

(51) Int. Cl.$^7$ ............................................. B63B 21/00
(52) U.S. Cl. ........................................... 114/219; 114/267
(58) Field of Search ........................... 114/219, 267; 293/71 R, 120; 267/139, 140

(56) References Cited

U.S. PATENT DOCUMENTS

| 3,455,269 | * | 7/1969 | Dean | 114/219 |
| 3,690,710 | * | 9/1972 | Curran | 293/71 R |
| 3,964,422 | * | 6/1976 | Boyd | 114/219 |
| 4,273,065 | * | 6/1981 | Lindsay et al. | 114/219 |
| 4,320,913 | * | 3/1982 | Kuroda | 293/120 |
| 4,351,257 | * | 9/1982 | Brown, Jr. | 114/219 |
| 5,269,248 | * | 12/1993 | Lee | 114/219 |

* cited by examiner

*Primary Examiner*—Stephen Avila
*Assistant Examiner*—Lars A. Olson
(74) *Attorney, Agent, or Firm*—Ronald E. Greigg; Edwin E. Greigg

(57) ABSTRACT

An elongate linear elastomeric fender comprising an outer sheath surrounding a core, wherein the core comprises a plurality of tubes, and the outer sheath has a higher compressibility than the core. The fender can be flexible and continuous, providing ease of transport and installation. The different layers of the fender provide different absorption of kinetic energy upon impact, and also dissipate impact energy transversely throughout the fender.

17 Claims, 1 Drawing Sheet

ELASTOMERIC FENDER

The present invention relates to an elastomeric fender, for example a marine fender.

BACKGROUND OF THE INVENTION

Marine fenders are designed to protect boats, piers, pontoons etc. from any damage caused by impact or rubbing between them. Whilst a series of discrete rigid plastic air-filled fenders are sometimes used, extended pontoons etc. are usually continuously 'lined' with an elongate elastic strip, and the most widely used material for this is natural or synthetic rubber. However, rubber strips are not only considered 'unsightly' (possibly especially to leisure boat owners), but they can also mark a boat hull even upon light impact. Such marks can again be unsightly, as well as being difficult and expensive to remove. Actual damage to the boat is even possible on heavy impact. Much of this is because the rubber material of such strips is relatively hard and has low compressibility.

SUMMARY OF THE INVENTION

According to one aspect of the present invention there is provided an elongate linear elastomeric fender comprising an outer sheath surrounding a core, wherein the core comprises a plurality of tubes, and the outer sheath has a higher compressibility than the core.

The fender of the present invention thus has a relatively soft (i.e. tendency to deform easily under pressure) outer sheath and a harder core. The outer sheath therefore initially absorbs the kinetic energy of the impact and deforms therewith before any remaining impact energy need be absorbed by the harder core. A gradual slowing of the impacting object is therefore achieved.

The outer sheath may be made from any suitable material which allows the outer sheath to have a relatively high compressibility. Such materials include low density plastics including foams, e.g. insulating foam. The outer sheath preferably also has a low impact reaction such that there is slow and hopefully minimal rebound upon impact.

The tubes of the core may also be made from any suitable material, preferably a plastic of relatively higher density than the outer sheath, e.g. polyethylene or PVC tubing. The outer sheath preferably has a higher compressibility than the material used for the tubes (as well as higher than the overall core).

The tubes are preferably hollow, and one or more may also be wholly or substantially filled with a fluid (as well as air). The fluid may be a liquid such as water, and preferably decreases the compressibility of the tubes. If desired or necessary, the ends of the tubes are sealed to retain the fluid therein. The tubes preferably having a sufficiently low compressibility to prevent complete transverse deformation (except under exceptional circumstances), so as to retain a physical barrier between the boat and pontoon etc. upon any reasonable load.

The tubes need not all be of the same external or internal diameter. The tubes are preferably arranged in a set geometric pattern within the outer sheath. Also preferably, the geometric pattern of the tubes is elastically deformable, which deformation also requires energy, i.e. the absorption of some of the impact energy. The tubes may be bound or connected together within the outer sheath, e.g. wrapped in elastic tape, to assist the ability of their geometry to deform and reform elastically.

By being elongate, the fender of the present invention is also able to absorb and dissipate some of the impact energy transversely from the point of impact throughout the fender, such that any rebound energy for reaction against the impacting object is reduced.

The outer sheath, core and/or tubes may be of any size, shape or design. One natural shape is circular. The thicknesses of the outer sheath and core may be of any relative ratio.

The fender is preferably flexible along its length, possibly because the outer sheath and core are made from flexible materials. Flexibility can facilitate installation of the fender. The fender can be in discrete lengths, or continuous, possibly continuous wholly or substantially along the length of the surface it is protecting. By being continuous and flexible, the fender can be coiled for ease of transportation and storage, and then cut to suit the particular use and/or locality. A continuous fender is also easier to fix or fasten to the surface to be protected.

The fender may have a protective covering or coating therearound. The covering or coating could be aesthetically coloured or designed, abrasion resistant and/or waterproof. The fender may also have end caps to protect and/or seal its ends.

The fender may be used in any location requiring or desiring an elastomeric fender which can provide gradual absorption of energy and slow or minimal rebound. Such locations include industrial and transport environments, hospitals, car parks, fun fairs, etc., as well as marine environments, especially marinas.

According to a second aspect of the present invention there is provided an elongate linear elastomeric fender comprising a plurality of concentric layers wherein each layer from the outside to the inner penultimate layer has a higher compressibility than its inner neighbour.

BRIEF DESCRIPTION OF THE DRAWING

An embodiment of the present invention will now be described by way of example only and with reference to the accompanying drawing showing a cross-section of an elastomeric fender according to the present invention.

In the FIGURE, there is shown an elastomeric fender comprising an outer sheath 2 of insulating foam material having a high compressibility surrounding a core 4 of nine hollow tubes made of polyethylene material. Each tube, and thus the overall core 4, has a compressibility lower than the outer sheath 2. The central tube 6 has a bigger diameter than the other tubes 7. The tubes 6,7 are arranged in a circular geometric pattern, and are bound together by a wrapping of elastic tape 8. The tape 8 allows relative movement of the tubes 6,7 under impact. The outer sheath 2 has an abrasion resistant coating 10. The fender is similar in materials and design to beer delivery lines used in public houses and commonly termed 'pythons'.

Figure 1:
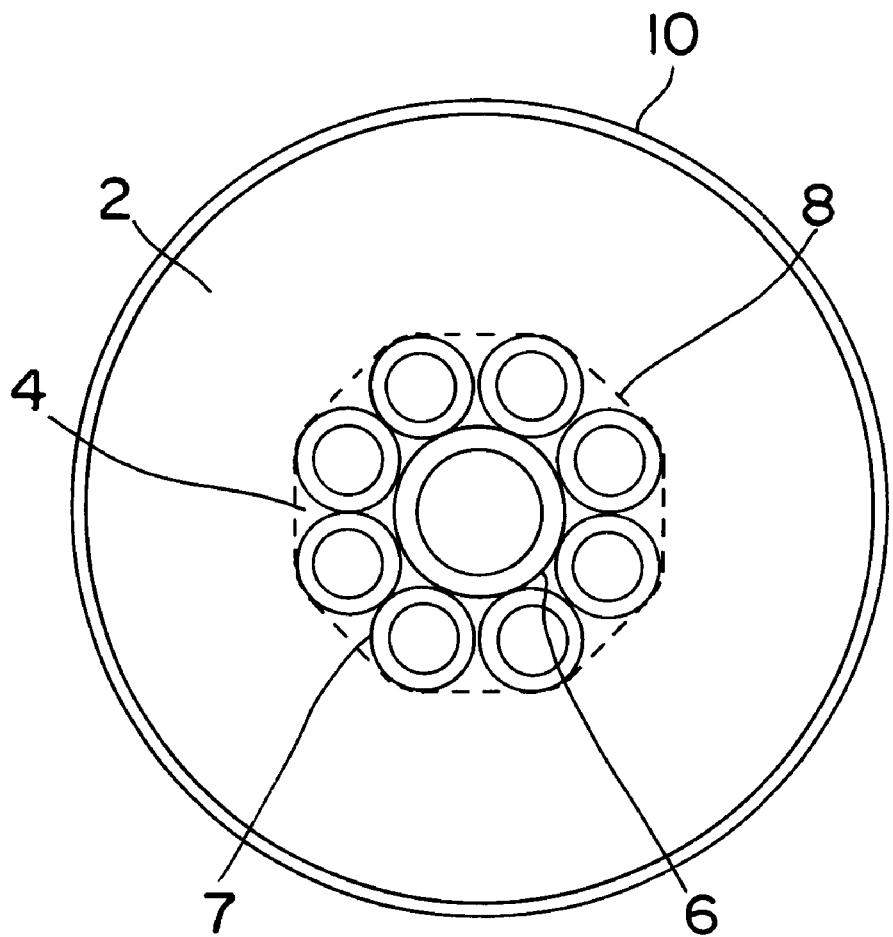

In use, for example in a marina, the fender is located around the or each pontoon above the waterline. It may be attached to the pontoon using any known means, e.g. ties, tags, etc. Any boat impacting the pontoon (whether docking or docked) initially impacts the outer sheath 2. The outer sheath 2 readily deforms under the pressure before the boat starts to impact the harder core 4. Any remaining kinetic energy of the boat will then be dissipated not only by deforming the tubes 6,7 themselves, but also by deforming the tube geometry. As all the tubes 6,7 are elongate, the energy to deform the tube geometry transversely from the point of impact can be considerable.

The fender is maintenance free and easy to install. The softer outer sheath 2 does not abrade the boat hull, and thus mark or damage it. The covering 10 may be of any suitable colour or design to match the surroundings.

Variations and modifications can be made to the above without departing from the scope of the invention described above.

What is claimed is:

1. An elongate linear elastomeric fender comprising an outer sheath (2) surrounding a core, wherein the core comprises a plurality of tubes (6, 7), and the outer sheath has a higher compressibility than the core, the tubes (6, 7) are bound or connected together by a wrapping of elastic tape (8) within the outer sheath.

2. A fender as claimed in claim 1 wherein the outer sheath is a low density plastic.

3. A fender as claimed in claim 1 wherein the tubes are made from a plastic of higher density than the outer sheath.

4. A fender as claimed in claim 3 wherein the tubes are made from PVC tubing.

5. A fender as claimed in claim 1 wherein the tubes are hollow.

6. A fender as claimed in claim 5 wherein at least one of the tubes is filled with a fluid.

7. A fender as claimed in claim 6 wherein the fluid is water.

8. A fender as claimed in claim 1 wherein the geometric pattern of tubes is elastically deformable.

9. A fender as claimed in claim 1 wherein the fender is substantially circular in cross-section.

10. A fender as claimed in claim 1 wherein the fender is flexible along its length.

11. A fender as claimed in claim 1 wherein the fender has a protective coating or covering therearound.

12. A fender as claimed in claim 1 wherein the fender has end caps.

13. A fender as claimed in claim 1 for use in a marine environment.

14. A fender as claimed in claim 1 wherein the fender is substantially continuous along a length of a surface to be protected.

15. A fender as claimed in claim 1 wherein the fender includes at least one means for attachment to a support.

16. A fender as claimed in claim 2 wherein the tubes are made from a plastic of higher density than the outer sheath.

17. An elongated linear elastomeric fender comprising a plurality of concentric layers wherein each layer from the outside to the inner penultimate layer has a higher compressibility than its inner neighbour ,said concentric layers include an outer sheath (2) surrounding a core comprising a plurality of tubes (6, 7) in which the outer sheath (2) has a higher compressibility than the plurality of tubes and the tubes are bound or connected together by a wrapping of an elastic tape (8) within the outer sheath.

* * * * *